(12) United States Patent
Grimm et al.

(10) Patent No.: US 8,339,767 B2
(45) Date of Patent: Dec. 25, 2012

(54) POWER CAPACITOR

(75) Inventors: Wilhelm Grimm, Roth (DE); Wilhelm Hübscher, Heldenfingen (DE); Harald Vetter, Heidenheim (DE)

(73) Assignee: EPCOS AG, Munich (DE)

( * ) Notice: Subject to any disclaimer, the term of this patent is extended or adjusted under 35 U.S.C. 154(b) by 685 days.

(21) Appl. No.: 11/913,397

(22) PCT Filed: Apr. 13, 2006

(86) PCT No.: PCT/DE2006/000663
§ 371 (c)(1),
(2), (4) Date: May 29, 2008

(87) PCT Pub. No.: WO2006/116961
PCT Pub. Date: Nov. 9, 2006

(65) Prior Publication Data
US 2009/0195957 A1 Aug. 6, 2009

(30) Foreign Application Priority Data

| May 2, 2005 | (DE) | 10 2005 020 320 |
| Jul. 5, 2005 | (DE) | 10 2005 031 366 |
| Jul. 5, 2005 | (DE) | 10 2005 031 367 |

(51) Int. Cl.
*H01G 4/06* (2006.01)
(52) U.S. Cl. ..... 361/311; 361/303; 361/305; 361/306.2; 361/328; 361/330
(58) Field of Classification Search .................. 361/311, 361/303–305, 306.2, 328–330, 312–313, 361/502, 301.2, 301.5, 306.1
See application file for complete search history.

(56) References Cited

U.S. PATENT DOCUMENTS

| 2,858,492 A | 10/1958 | Lamphier |
| 3,274,663 A | 9/1966 | Bonenfant et al. |
| 3,711,746 A | 1/1973 | King |
| 3,956,677 A | 5/1976 | Quick |
| 4,240,127 A | 12/1980 | Fanning et al. |
| 4,486,810 A | 12/1984 | Tomita et al. |
| 4,633,368 A | 12/1986 | Frederick |
| 5,034,849 A | 7/1991 | Vetter |
| 5,057,648 A | 10/1991 | Blough et al. |
| 5,132,896 A | 7/1992 | Nishizawa et al. |
| 5,365,424 A | 11/1994 | Deam et al. |
| 5,530,618 A | 6/1996 | Carroll et al. |
| 5,581,437 A | 12/1996 | Sebillotte et al. |
| 5,659,455 A | 8/1997 | Herbert |
| 5,905,628 A | 5/1999 | Okuno et al. |

(Continued)

FOREIGN PATENT DOCUMENTS

DE B20997 1/1956

(Continued)

OTHER PUBLICATIONS

International Preliminary Report on Patentability in Application No. PCT/DE2006/000716, dated Nov. 13, 2007.

(Continued)

*Primary Examiner* — Nguyen T Ha
(74) *Attorney, Agent, or Firm* — Fish & Richardson P.C.

(57) ABSTRACT

A power capacitor is described herein. The power capacitor includes a housing and at least one capacitor winding. The power capacitor also includes at least one mechanical spring element between the housing and the at least one capacitor winding.

9 Claims, 5 Drawing Sheets

U.S. PATENT DOCUMENTS

| | | | |
|---|---|---|---|
| 6,021,040 A | 2/2000 | Suzuki et al. | |
| 6,088,215 A | 7/2000 | Webb et al. | |
| 6,094,337 A | 7/2000 | Ueda et al. | |
| 6,112,073 A | 8/2000 | Lee et al. | |
| 6,166,464 A | 12/2000 | Grant | |
| 6,212,058 B1 | 4/2001 | Huber | |
| 6,236,566 B1 | 5/2001 | Regnier et al. | |
| 6,249,448 B1 | 6/2001 | Regnier et al. | |
| 6,262,876 B1 | 7/2001 | Schimanek | |
| 6,268,996 B1 * | 7/2001 | Landsgesell | 361/540 |
| 6,282,081 B1 * | 8/2001 | Takabayashi et al. | 361/502 |
| 6,307,733 B1 * | 10/2001 | Maruyama et al. | 361/511 |
| 6,493,249 B2 | 12/2002 | Shirakawa et al. | |
| 6,525,924 B2 | 2/2003 | Gallay et al. | |
| 6,525,950 B1 | 2/2003 | Shirakawa et al. | |
| 6,538,878 B1 | 3/2003 | Acker et al. | |
| 6,618,278 B2 | 9/2003 | Suzuki et al. | |
| 6,629,854 B2 | 10/2003 | Murakami | |
| 6,631,071 B2 * | 10/2003 | Kitagawa et al. | 361/328 |
| 6,636,429 B2 * | 10/2003 | Maly et al. | 361/818 |
| 6,791,854 B2 | 9/2004 | Shirakawa et al. | |
| 6,843,335 B2 | 1/2005 | Shirakawa et al. | |
| 6,857,626 B2 * | 2/2005 | Burlage et al. | 267/220 |
| 6,867,970 B2 | 3/2005 | Muller et al. | |
| 6,885,553 B2 | 4/2005 | Pfeifer et al. | |
| 6,888,235 B2 * | 5/2005 | Lopata et al. | 257/691 |
| 6,943,445 B2 | 9/2005 | Shirakawa et al. | |
| 6,954,368 B1 | 10/2005 | Francoeur et al. | |
| 6,987,670 B2 | 1/2006 | Ahmed et al. | |
| 7,151,661 B2 | 12/2006 | Kimura et al. | |
| 2001/0011183 A1 | 8/2001 | Munshi | |
| 2004/0095708 A1 | 5/2004 | Takeda et al. | |
| 2004/0230847 A1 | 11/2004 | Patwardhan et al. | |
| 2005/0168911 A1 | 8/2005 | Staib | |
| 2005/0168918 A1 | 8/2005 | Araki et al. | |
| 2005/0184602 A1 | 8/2005 | Won | |
| 2005/0263845 A1 | 12/2005 | Saito et al. | |
| 2006/0050468 A1 | 3/2006 | Inoue et al. | |
| 2006/0104006 A1 | 5/2006 | Saito et al. | |
| 2006/0146480 A1 | 7/2006 | Thrap | |
| 2006/0232942 A1 | 10/2006 | Nakatsu et al. | |
| 2006/0239050 A1 | 10/2006 | Andersson et al. | |
| 2006/0284308 A1 | 12/2006 | Harada et al. | |
| 2009/0040685 A1 | 2/2009 | Hiemer | |
| 2009/0059467 A1 | 3/2009 | Grimm | |

FOREIGN PATENT DOCUMENTS

| | | |
|---|---|---|
| DE | 972237 | 6/1959 |
| DE | 2157690 | 5/1973 |
| DE | 7901948 | 1/1979 |
| DE | 8136324 | 12/1981 |
| DE | 3443069 | 5/1988 |
| DE | 3723733 | 1/1989 |
| DE | 4008417 | 9/1991 |
| DE | 29802368 | 2/1998 |
| DE | 19741146 | 4/1999 |
| DE | 19845821 | 4/2000 |
| DE | 10153748 | 5/2003 |
| DE | 10301268 | 7/2003 |
| DE | 10345501 | 8/2005 |
| EP | 0022968 | 1/1981 |
| EP | 0471508 | 2/1992 |
| EP | 0598256 | 5/1994 |
| EP | 0616401 | 9/1994 |
| EP | 0949641 | 10/1999 |
| EP | 0994494 | 4/2000 |
| JP | 09-260180 | 10/1997 |
| JP | 10-064771 | 3/1998 |
| JP | 2003-133175 | 5/2003 |
| JP | 2004-319799 | 11/2004 |
| WO | WO99/14774 | 3/1999 |
| WO | WO99/43190 | 8/1999 |
| WO | WO00/19788 | 4/2000 |
| WO | WO03/092023 | 11/2003 |
| WO | WO2005/029519 | 3/2005 |
| WO | WO2006/116967 | 11/2006 |

OTHER PUBLICATIONS

International Preliminary Report on Patentability in Application No. PCT/DE2006/0006636, dated Nov. 13, 2007.

International Search Report in Application No. PCT/DE2006/000663, dated Mar. 21, 2007.

International Search Report in Application No. PCT/DE2006/000716, dated Mar. 9, 2007.

Prosecution History in U.S. Appl. No. 11/918,931.

Machine Translation of German Application No. 3723733 (Pub: Jan. 26, 1989).

Prosecution History in U.S. Appl. No. 11/913,391.

* cited by examiner

POWER CAPACITOR

CROSS REFERENCE TO RELATED APPLICATIONS

Pursuant to 35 USC §120, this application claims the benefit of PCT/DE2006/000663 filed Nov. 1, 2007 which claims the benefits of German Patent Application No. 102005020320.5 filed May 2, 2005, 102005031366.3 filed Jul. 5, 2005 and 102005031367.1 filed Jul. 5, 2006. Each of these applications is incorporated by reference in its entirety.

TECHNICAL FIELD

A power capacitor will be specified.
A capacitor is known from the publication EP 0 598 256 B1.

BACKGROUND

A problem to be solved consists in specifying a power capacitor that is protected against vibrations.

SUMMARY

A power capacitor will be specified that has a capacitor winding and a housing. The capacitor winding can be constructed, for example, using MPM film winding technology. The dielectric for the film winding can be, for example, polyester, PEN, PPS, or also polypropylene. Flat windings and round windings can also come into consideration.

In an example embodiment, a dielectric made from polyester can have a dielectric constant of 3.3. A dielectric made from polyester can be very stable thermally.

A power capacitor will be specified that is suitable for absorbing a large electrical current. The maximum current can equal preferably between 50 and 300 Amperes.

The nominal voltage of the power capacitor preferably equals between 150 and 600 Volts.

In the housing of the capacitor, one or also several capacitor windings can be provided, which contribute to the capacitance of the capacitor. For example, two capacitor windings each with a capacitance of one millifarad can be stacked one above the other and connected by means of a parallel circuit to form a nominal capacitance of $C_{Nenn}=2$ mF. The capacitance, however, can also assume other values.

The film thickness of the dielectric contained in the film winding preferably equals a few micrometers, especially preferred around 3 µm. Therefore, an especially large capacitance can be achieved with low space requirements and still adequate electric strength.

In a special embodiment of the power capacitor, a capacitor winding is provided, which is provided on two side surfaces with a Schoop layer. Here, it can preferably involve a flame-sprayed or arc-sprayed metallic layer that preferably contains zinc or a film construction containing a film with zinc and another film with zinc and also a film with copper.

Through a suitable selection of the geometries of the capacitor winding, Schoop layer, and housing, a capacitance can be set between the capacitor elements and the housing (also terminal-housing capacitance), which is suitable for suppressing interference in a voltage-system converter and which has generally favorable properties in terms of EMV (electromagnetic compatibility).

In one embodiment of the power capacitor, it is provided that a winding is contacted by means of two contact films arranged on opposing sides of the film winding. These contact films can be, for example, Schoop layers.

In one embodiment of the power capacitor, several capacitor windings are contained in the capacitor housing, with each contact film of the individual windings to be connected to a common external pole lying on the same side of the power capacitor.

In addition, a power capacitor will be specified, in which a capacitor housing is provided. In addition, at least one capacitor winding is provided in the interior of the housing. A mechanical, elastic element is provided between a capacitor winding and the housing. Such an elastic element can help to absorb the volume expansion of the capacitor winding during heating. On the other hand, however, such an elastic element also has the advantage that vibrations, like those appearing, for example, during the operation of a motor vehicle, can be damped.

In a preferred embodiment of the capacitor, mechanical, elastic elements are arranged on two opposing sides of a capacitor winding, so that the mechanical fixing of the capacitor winding can be realized especially well. The elastic elements could also be arranged on all sides in a peripheral direction.

In an especially preferred way, a so-called "spring pad" is used as the mechanical, elastic element. A spring pad is preferably produced from a plastic foam, with the individual pores of the foam forming gas-tight, enclosed cells that are filled with a gas, for example $CO_2$. A "spring pad" produced in this way has the advantage that it is very insensitive relative to material fatigue. The spring properties are caused primarily not by the compression and decompression of a solid body, but instead by the enclosed gas bubbles and thus through compression or decompression of a gas volume. Such elastic elements have a service life of many years, without losing their elastic properties due to aging or other processes.

With the help of one or more elastic elements between the capacitor winding and housing, a fixed positioning of the capacitor winding in the housing can be achieved. For the case that the housing is an electrical conductor, an essentially constant capacitance between a contact film of a capacitor winding and the housing and thus a constant and relatively exactly adjustable terminal-housing capacitance can be provided, which has the advantage of very favorable properties in terms of EMV or which can be used for suppressing interference in a voltage-system converter.

In an especially preferred embodiment of the capacitor, it is provided that the housing has the shape of a trough, with the trough having a base and, for example, four side walls, and also an open upper end. On the side surfaces of the trough, mounting eyelets or mounting elements can be provided, with whose help the power capacitor can be mounted on another electronic element. On the upper side of the housing, a peripheral groove can also be provided for receiving a sealing ring.

For fixing a capacitor winding in the housing, an insulating shell can be provided, which is inserted—to some extent as a second trough—into the lower region of the housing. In the insulating trough, the capacitor winding is then inserted. For closing the capacitor in an insulating way at the open end of the housing, a second insulating shell is placed on the upper side.

In a preferred embodiment, the lower and the upper shells are expanded to form an essentially enclosed housing.

According to a special embodiment of the capacitor, it can be provided that the upper shell has openings, through which the outer contact elements or pairs of contact elements can pass. Electrically insulating collars, which are used for insulating the outer contact elements, are arranged at the openings of the upper shell.

In another embodiment of the capacitor, it can be provided that the lower insulating shell has a structured or profiled section on its outer side or also a structured or profiled section on its inner side, by means of which the friction between the insulating shell and a mechanical, elastic element can be increased. Thereby, the positional stability of the mechanical, elastic element (e.g., spring pad) can be improved. The structured or profiled section of the shell makes it more difficult for the spring element to slip.

In an especially preferred embodiment of the capacitor, a cooling surface that can be used for cooling the capacitor is provided on the upper side. Such a cooling surface can be formed in an especially preferred way by a sheet-metal strip or a ribbon cable. Such a ribbon cable can be formed, e.g., from two overlapping sheet-metal strips, which are insulated from each other and which are connected to outer contacts of the capacitor and which are used for energizing the capacitor winding. For example, the upper of two electrically conductive sheets can be used as a cooling element. Through a suitable construction, care can be taken that the upper of the electrically conductive sheets is closed sufficiently well with the upper edge of the housing, with which a good mechanical contact can be provided, preferably a good thermo-mechanical contact of the upper sheet to another housing to be mounted on the upper side—which provides, e.g., a cooling plate.

In order to reduce the risk of a short circuit, it is advantageous if electrical insulation is arranged on the surface of the cooling element. For example, such insulation can be formed by a transparent, insulating film, which is, for example, only a few micrometers thick and which thus only insignificantly prevents heat transport. In a different embodiment, the electrical insulation is guaranteed by the upper of two insulating shells, which is possible essentially in that the wall thickness of the insulating shell is selected sufficiently thin. The wall thickness can equal, for example, 0.3 mm.

In addition, an electrical module is described, wherein a first unit of the module concerns an electronic system containing, e.g., IGBT modules. In general, the first unit can be an electrical device for power electronics. Another unit of the module is the capacitor described here. Preferably, the upper side of the capacitor or the housing of the capacitor is connected over an area to the bottom side of the first unit. The outer contacts of the capacitor here project into the housing of the first unit and are connected there, for example, by means of a threaded connection, to the IGBTs located there. The first unit does not necessarily have to contain IGBTs; it can also contain other electronic components or also mechanical components.

Preferably, the bottom side of the first unit, that is, the side of the first unit in contact with the capacitor, is equipped with a device for heat dissipation. Such a device can be, for example, a metal plate provided with holes. Such a device, however, can also be constructed in the form of cooling ribs.

Preferably, there is a good planar contact between the upper current rail in the capacitor and the cooling device of the first unit. Therefore, in an advantageous way, heat generated in the capacitor can be easily dissipated to the outside. In one embodiment of the capacitor, the upper side of the capacitor is formed by a thin insulating film, which has only a low heat resistance and which thus provides for good heat transport from the capacitor to the first unit of the electronic module.

DESCRIPTION OF THE DRAWINGS

The subject matter described here will be explained in more detail below with reference to the figures.

The dimensional information specified in the figures is to be understood only as an example. It does not limit the subject matter described here. The same elements or elements with the same function are labeled with the same reference symbols.

DETAILED DESCRIPTION

Figure 1:
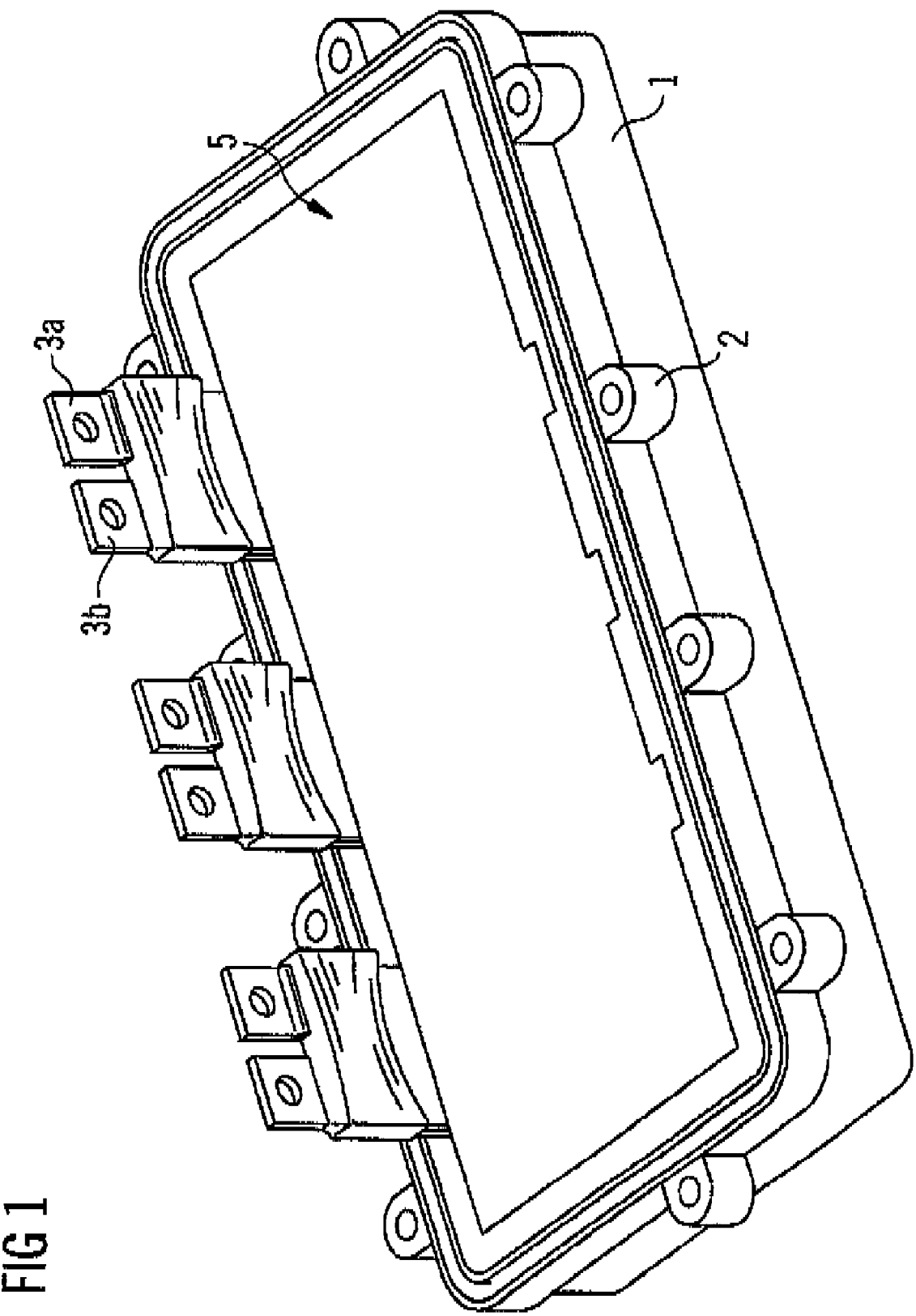
FIG. 1 shows a capacitor in a perspective view.

FIG. 1 shows a capacitor with a housing 1, on whose upper side several mounting eyelets 2 are arranged in the peripheral direction. The mounting eyelets 2 can help mount the capacitor on another electronic unit. Such a unit is shown, for example, in FIG. 5.

Figure 2:
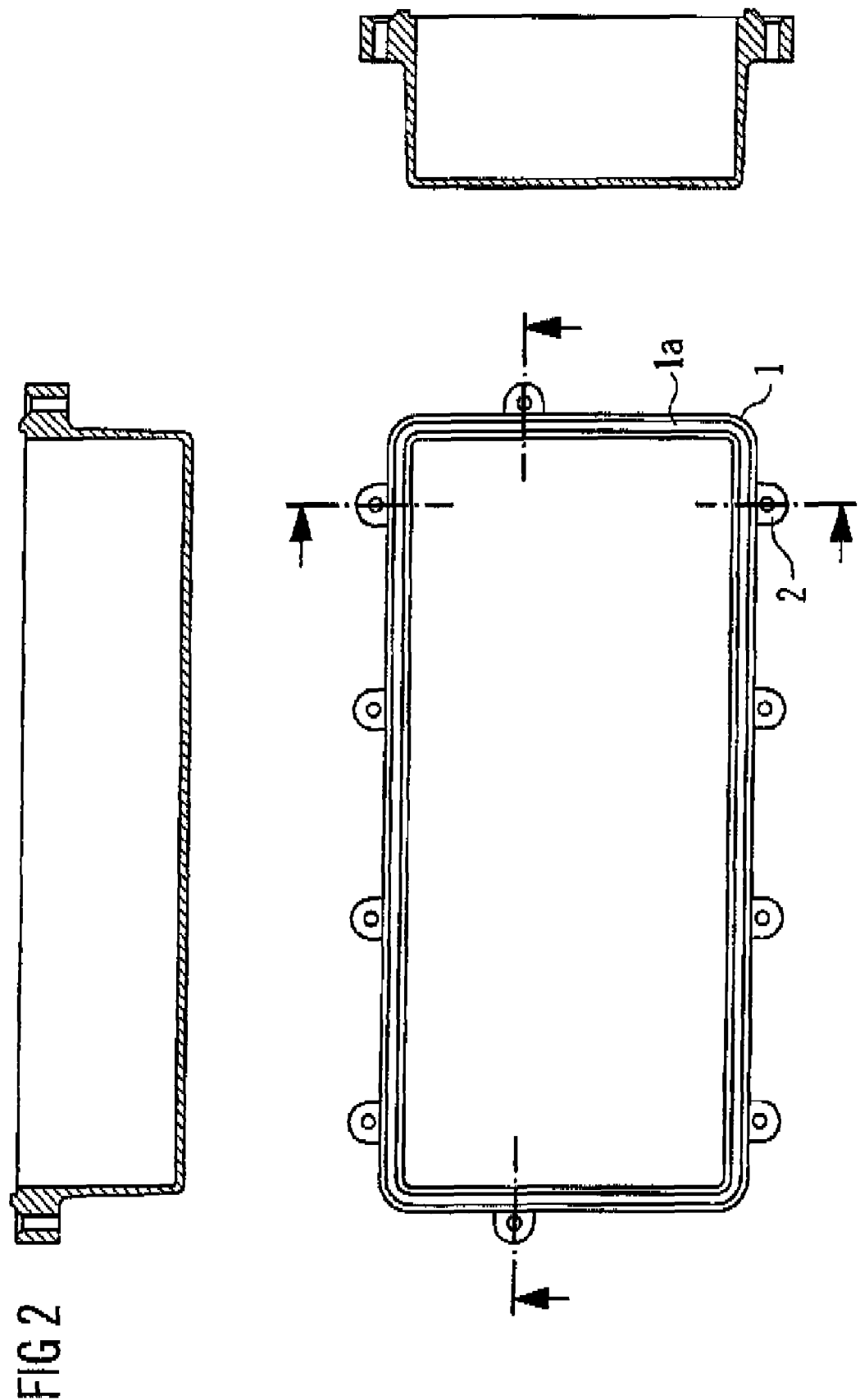
FIG. 2 shows as an example the construction of the capacitor from FIG. 1.

FIG. 2 shows the housing as a construction drawing. The housing 1 can be made, for example, from aluminum or can contain aluminum. The length of the housing equals approximately 25 cm. The width of the housing equals around 12 cm. 10 mounting eyelets are arranged on the periphery of the housing. The number of mounting eyelets, however, can vary according to how large the housing is and what type of mechanical stability is required for the connection of the housing to another electronic unit. The depth of the trough-shaped housing equals approximately 6 cm. A peripheral groove 1a, which is used for receiving a sealing compound or a sealing ring, is arranged on the upper side of the housing.

Figure 3:
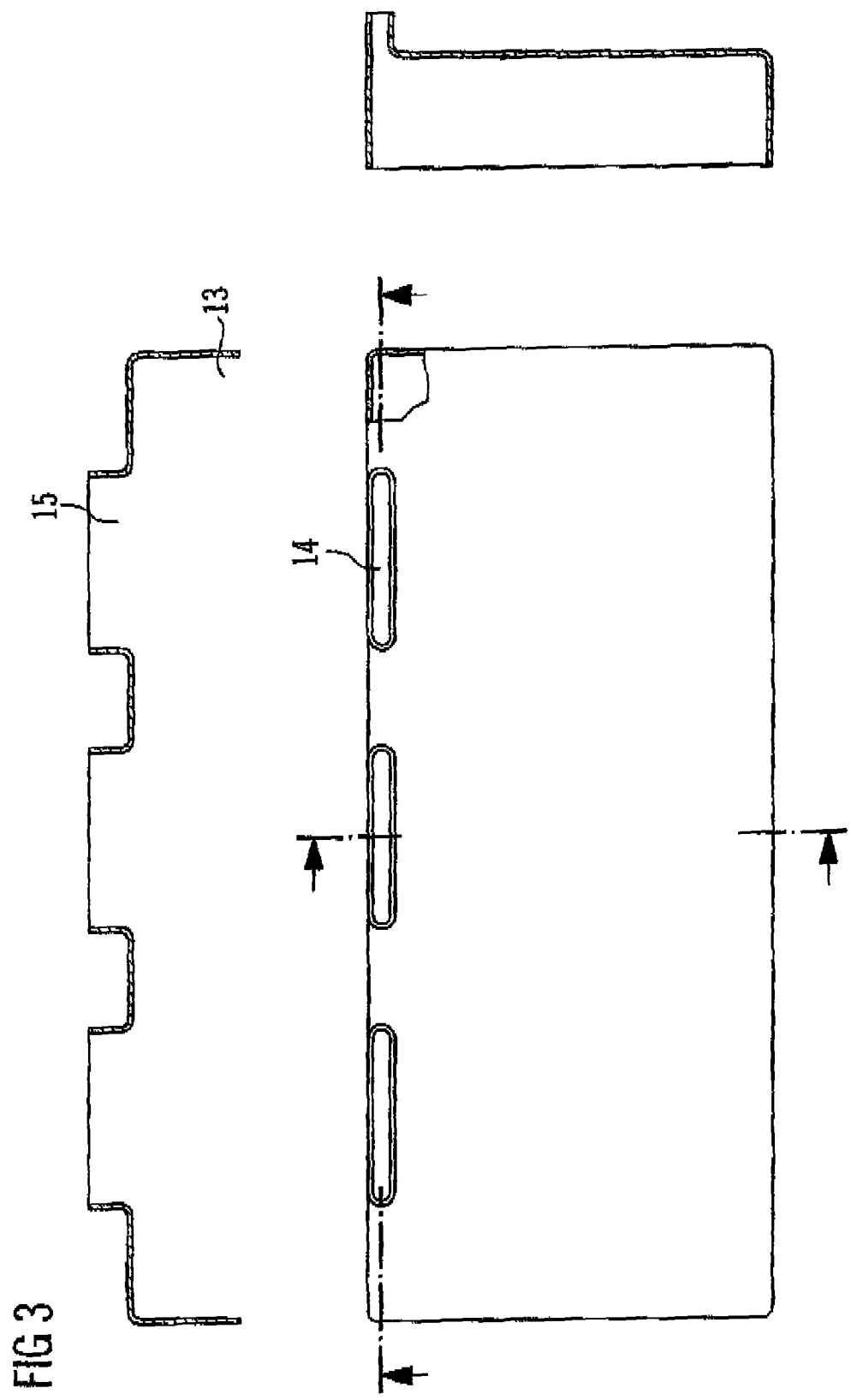
FIG. 3 shows the upper part of an insulating shell as a construction drawing.

FIG. 3 shows the upper part of an insulating shell, which can be arranged between the capacitor winding or windings and the housing of the capacitor. The shell is preferably made from insulating material, for example, polycarbonate or PP with a preferred thickness of 0.3 to 0.5 mm. The upper half shell 13 is shaped so that it can be placed somewhat like a cover over the capacitor winding. It is provided with longitudinal holes 14, through which the outer contacts of the current supply elements can project. In the region of the holes 14, preferred collars 15 can be arranged, which insulate the lower region of the outer connections.

The wall thickness of the upper half shell 15 should be relatively thin at least in the upper (cover) region, in order to guarantee good cooling from the upper side of the capacitor.

Figure 4:
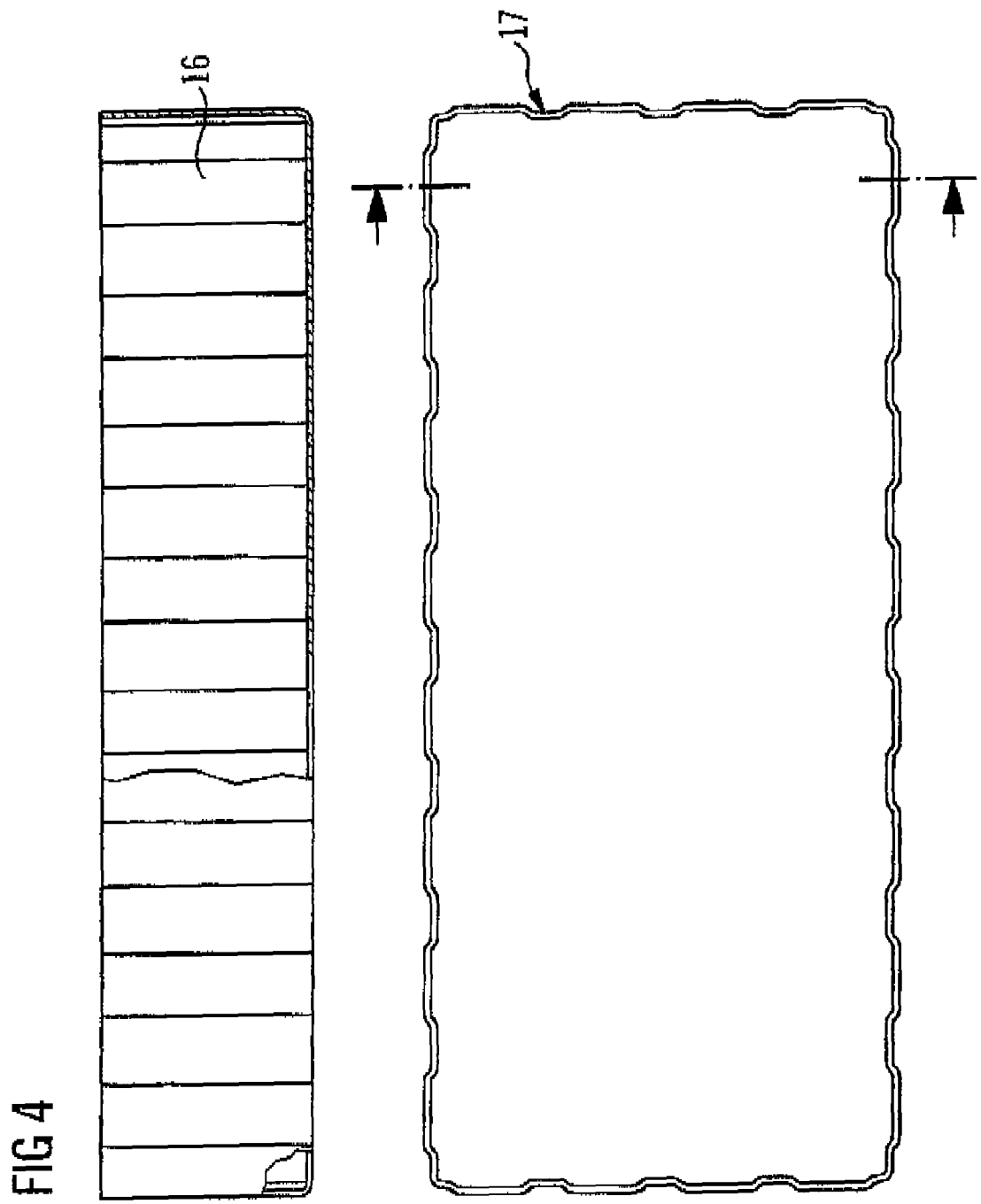
FIG. 4 shows the lower part of an insulating shell as a construction drawing.

FIG. 4 shows a lower half shell 16, which is preferably inserted into the housing before the insertion of the capacitor winding. It is preferably made from insulating material like the upper half shell 13.

The lower half shell is equipped with a surface profiled section 17 shown in FIG. 4. The surface profiled section can correspond both to the outer side and also to the inner side of the insulating shell.

The surface profiled section has the advantage that a mechanical, elastic element, which presses against the lower half shell and consequently against the surface structure, cannot easily slip due to the increased friction. Therefore, slipping of the spring element can be stopped. Here, the spring element can lie both on the outer wall of the shell 16 and also on the inner wall of the shell 16.

Figure 5:
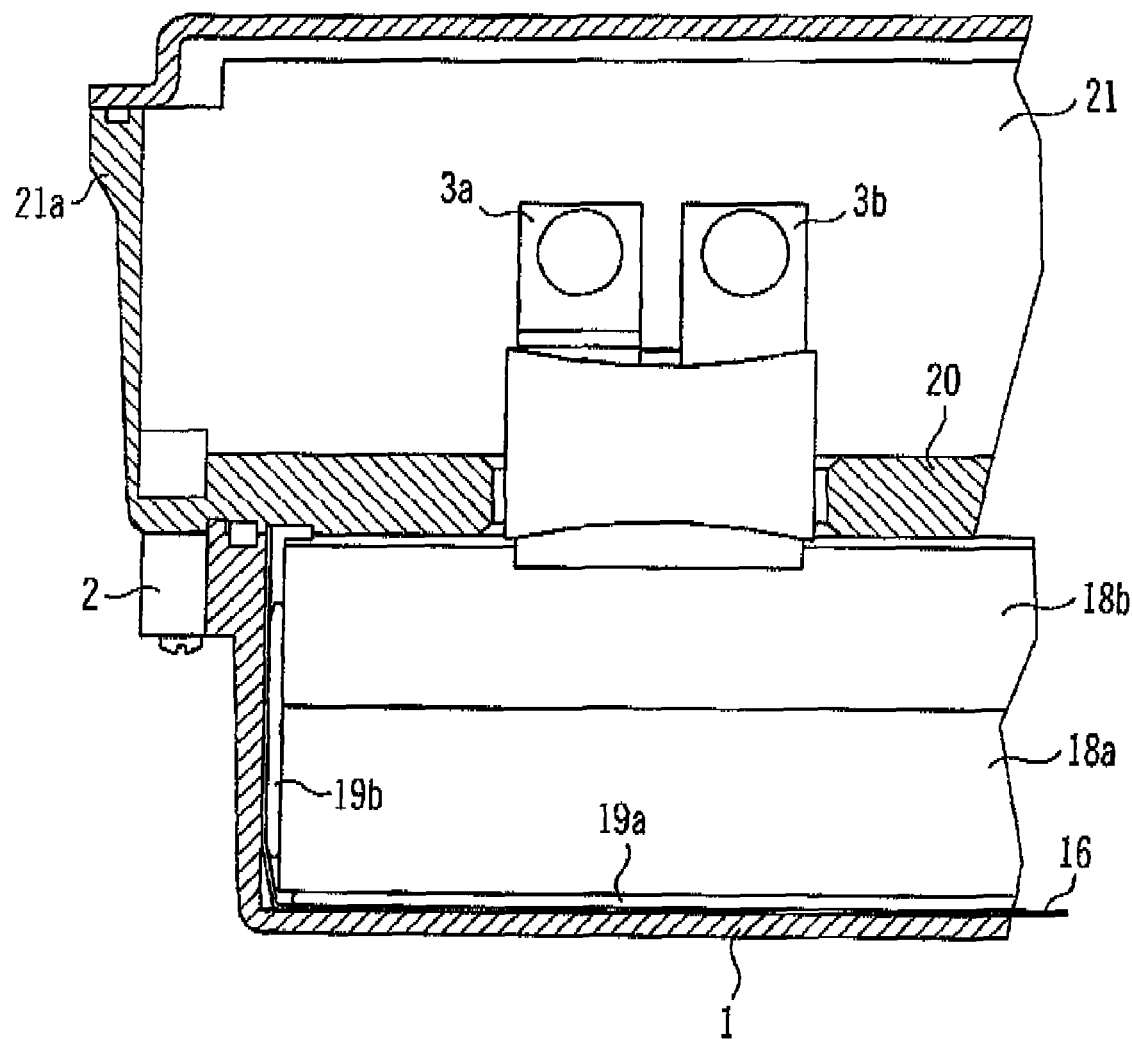
FIG. 5 shows an electrical module in a schematic cross section.

FIG. 5 shows a capacitor as a component of an electronic unit, which can be, for example, a voltage-system converter. The electronic unit 21 here contains several IGBT modules in one housing 21a. On the bottom side of the housing 21a, a capacitor is arranged, which is fixed, for example, by screws, to the housing 21a by means of the mounting eyelets 2.

The outer connections 3a or 3b project through holes in the housing 21a into the interior of the electronic unit 21. On the lower side of the housing 21a, a cooling plate 20 is provided, which is suitable for heat transport. The lower side of the cooling plate 20 is in direct thermal contact with the elements of the capacitor, especially with the upper side of the upper half shell according to FIG. 5 forming the upper seal of the capacitor. The upper side of the capacitor, however, can also be formed by a transparent, insulating film according to FIG. 1, especially for the case that no insulating half shells are arranged in the capacitor, but instead the capacitor winding is held by a sealing compound in the housing of the capacitor.

In FIG. 5, the capacitance of the capacitor is formed essentially by two capacitor windings 18a, 18b, which are placed in the housing one above the other. An insulating half shell 16 in the form of a lower half shell is arranged between the capacitor windings and the housing 1 of the capacitor. Spring elements are installed between the lower half shell 16 and the capacitor windings. Here, the spring element 19a is installed on the side of the base and the spring element 19b is installed on the side of the wall. In an especially preferred embodiment of the capacitor, the spring elements are installed on all sides.

The capacitor windings can be held with low vibrations in the housing by the spring elements. The base-side spring element 19a here fulfills another function. Because it presses the capacitor windings 18a, 18b and the elements located above upward, it can provide improved heat contact of the cooling plate 20 with the elements forming the upper seal of the capacitor. This improves the dissipation of waste heat of the capacitor.

The invention claimed is:

1. A module for power electronics, comprising:
a capacitor comprising a trough-shaped housing and at least one capacitor winding;
at least one mechanical spring element on a base of the housing; and
an electrical unit having a base region;
wherein the capacitor is mounted on the base region of the electrical unit; and
wherein the spring element is configured to press the at least one capacitor winding onto the base region of the electrical unit.

2. The module of claim 1, wherein the at least one mechanical spring element comprises a spring element on each of two opposing sides of the at least one capacitor winding.

3. The module of claim 1, further comprising a profiled insulating shell between the at least one capacitor winding and the housing holding the spring element.

4. The module of claim 1, further comprising a cooling plate in thermal contact with a cooling surface of the capacitor formed by a current rail on the base of the electrical unit.

5. The module of claim 4, further comprising an electrical insulating film on a side of the cooling surface facing the electrical unit.

6. The module of claim 1, further comprising IGBTs.

7. The module of claim 1, wherein the at least one mechanical spring element comprises a spring pad.

8. The module of claim 1, wherein the spring pad comprises plastic foam.

9. The module of claim 8, wherein the plastic foam comprises pores that define gas-tight enclosed cells, the gas-tight enclosed cells storing gas.

* * * * *

UNITED STATES PATENT AND TRADEMARK OFFICE
CERTIFICATE OF CORRECTION

PATENT NO. : 8,339,767 B2
APPLICATION NO. : 11/913397
DATED : December 25, 2012
INVENTOR(S) : Wilhelm Grimm, Wilhelm Hübscher and Harald Vetter It is certified that error appears in the above-identified patent and that said Letters Patent is hereby corrected as shown below:

Column 1, Line 7;
Delete "Nov. 1, 2007" and Insert -- Apr. 13, 2006 --

Column 6, Claim 8, Line 28;
Delete "claim 1," and Insert -- claim 7 --

Signed and Sealed this
Twelfth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,339,767 B2
APPLICATION NO. : 11/913397
DATED : December 25, 2012
INVENTOR(S) : Wilhelm Grimm, Wilhelm Hübscher and Harald Vetter It is certified that error appears in the above-identified patent and that said Letters Patent is hereby corrected as shown below:

In the Specifications

Column 1, Line 10;
Delete "Jul. 5, 2006" and Insert -- Jul. 5, 2005 --

Signed and Sealed this
Twenty-first Day of May, 2013

Teresa Stanek Rea
*Acting Director of the United States Patent and Trademark Office*